United States Patent [19]
Burns

[11] 3,824,000
[45] July 16, 1974

[54] COILED SPRING MIRROR MOUNT FOR OPTICAL STABILIZER

[75] Inventor: Richard H. Burns, Webster, N.Y.

[73] Assignee: Bausch & Lomb Incorporated, Rochester, N.Y.

[22] Filed: Jan. 8, 1973

[21] Appl. No.: 321,894

[52] U.S. Cl............. 350/245, 350/245, 350/287, 350/288, 350/310, 248/476, 248/205
[51] Int. Cl. ............................................. G02b 7/02
[58] Field of Search .......... 350/245, 247, 252, 257, 350/251, 287, 288, 97, 310; 248/475 R, 476, 205; 9/8.3 R; 356/149, 250

[56] References Cited
UNITED STATES PATENTS

| | | | |
|---|---|---|---|
| 3,006,251 | 10/1961 | Wells | 350/99 |
| 3,161,826 | 12/1964 | Picard | 350/285 UX |
| 3,397,090 | 8/1971 | Humphrey | 356/149 |

Primary Examiner—Ronald L. Wibert
Assistant Examiner—Michael J. Tokar
Attorney, Agent, or Firm—Frank C. Parker; Bernard D. Bogdon; Harry C. Post

[57] ABSTRACT

A device for mounting a stabilized optical element in a hydrostatic stabilizer cell utilizing a coiled, springy wire as the connection between the wall of the cell and the optical element.

7 Claims, 6 Drawing Figures

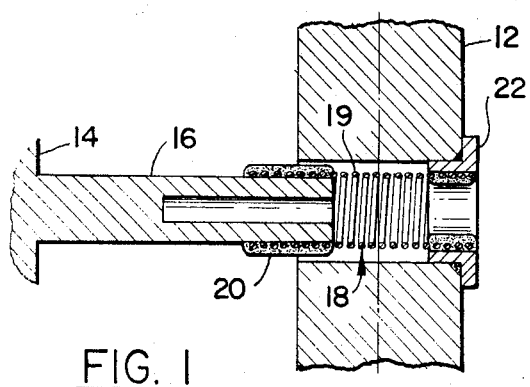
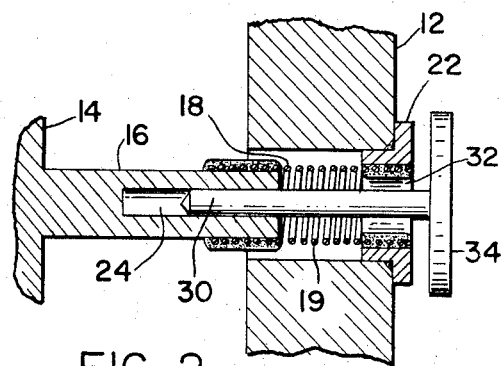
FIG. 1
FIG. 2
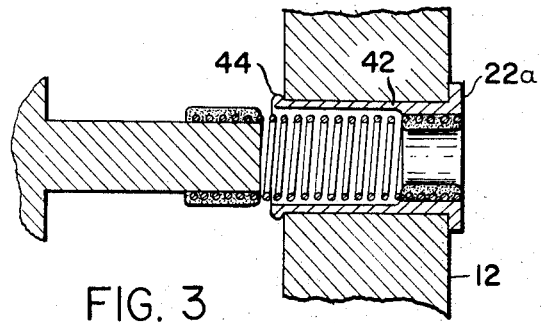
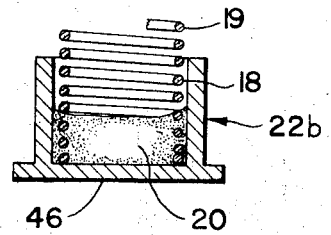
FIG. 3
FIG. 4
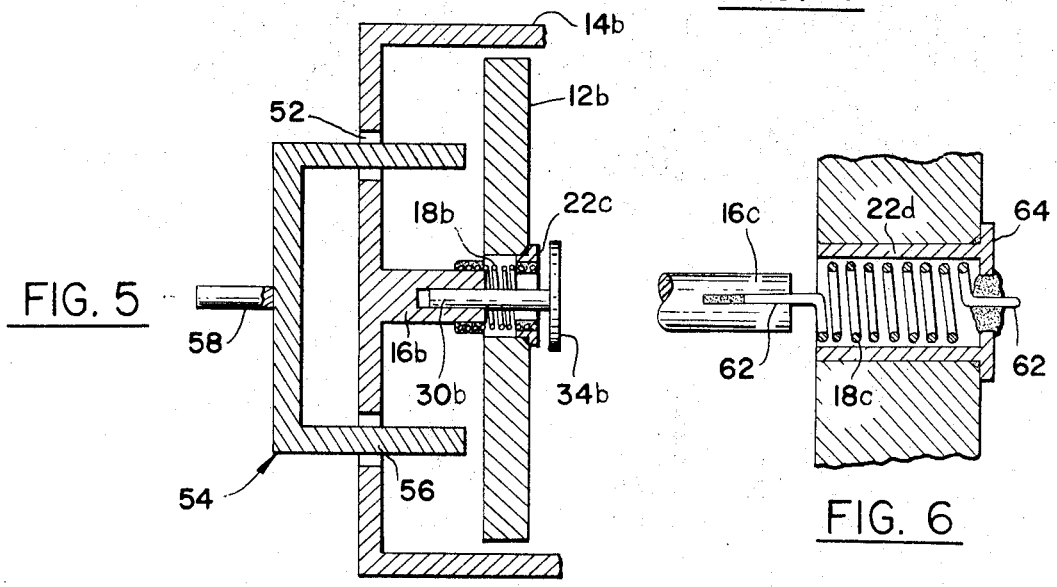
FIG. 5
FIG. 6

COILED SPRING MIRROR MOUNT FOR OPTICAL STABILIZER

BACKGROUND OF THE INVENTION

1. Field of the Invention

The invention lies in the field of optical mounting mechanisms, and more particularly in the field of resilient pivotal mounts for optical members immersed in fluids.

It is especially concerned with mounting mechanisms used in systems which stabilize optics against small-angle deviations thereof from a desired line of sight.

2. Description of the Prior Art

Optical stabilization or accidental-motion compensation is of great importance in hand-held instruments and in instruments which are mounted on moving or vibrating platforms, such as tanks, aircraft, ships and the like, wherein a substantial magnification is desired. Stabilization means are adapted to filter out high frequency angular motions of small amplitude while at the same time passing or transmitting low frequency angular motion of large amplitude such as occurs when the instrument is panned. It is almost impossible for a hand optical device such as a camera or telescope to be maintained entirely free from slight motions or tremors which in the absence of stabilization causes a focused image to move or "dance." This problem becomes increasingly apparent with increased magnification as optical magnifying systems not only magnify the image viewed but also magnify relative motion thereof.

An optical train in a telescope for example, can be stabilized by placing a stabilized optical member, such as a mirror, between the objective lens and the imaging plane of the instrument. The optical member supported in a fluid filled chamber or cell is coupled by the fluid to the walls of the chamber and will undergo a proportional angular movement with reference to space when the chamber is moved with reference to space.

The known mounting means for immersed optical members in hydrostatic optical stabilizer cells or chambers includes means extending from a wall of such cells to the backs of such members. The extended portion may include merely a needlepoint upon which the optical member pivots, the optical member being biased in place magnetically. Such support means are not wholly satisfactory since localized magnetic aberrations upset the optical alignment, and the accomplishment of the original alignment is therefore a difficult and tedious procedure.

Another known mounting means comprises a very small diameter (perhaps 0.002 inch) wire fastened at one end to the optical member and at the other to an arm extending from the chamber wall. To be sufficiently flexible such a wire must be extremely thin and is therefore very fragile. Such wires break easily or may pull out of their mounts if the optical member is bumped, as frequently happens during assembly. The fragility of such a wire prevents the use of a caging device with an optical member so mounted because a caging mechanism would damage the wire or force the optical member free of the wire.

SUMMARY OF THE INVENTION

This invention relates to an improved means of mounting an optical member in a hydrostatic stabilizer cell. The mount includes a coiled wire having several turns between its connection with the cell wall mount and its connection with the optical member. The use of the coils allows the employment of heavier gauge wire than is found in prior art mounts, without loss of flexibility. The coils must be spaced from each other to provide maximum flexibility to accommodate rotational movement of the optical member.

When coiled, the wire affords a more yielding mount for the optical member than would a shorter straight length of the same gauge wire. Neither the size nor the number of coils are of critical importance although five to ten free coils seem to be a convenient number. The length of wire required in the free portion of the coil increases with the thickness of the wire, and is dependent upon the natural frequency which is sought to be obtained in the coil. A straight wire of the same gauge and length as the coiled wire would be awkwardly long and difficult to mount. It would also be subject to damage by violent axial shocks as it would have no resilience in that direction.

BRIEF DESCRIPTION OF THE DRAWING

FIG. 1 is a sectional view of an optical member mounted on a wire coil, according to the invention.

FIG. 2 is a sectional view of a modification of the mounting shown in FIG. 1.

FIG. 3 is a sectional view of an assembly including a modified ferrule which might be used in the mountings disclosed in FIGS. 1 or 2.

FIG. 4 is a sectional view of another ferrule and wire coil fastened to each other.

FIG. 5 is a sectional view of a caging mechanism for use with the mounting of the invention.

FIG. 6 is a sectional view of a modification of the wire coil shown in FIG. 1.

DETAILED DESCRIPTION OF THE PREFERRED EMBODIMENTS

The invention is used in an optical stabilizer cell wherein a space is enclosed by walls which define a chamber. A motion damping and floatation fluid fills the chamber within which a movable optical member is immersed.

In FIG. 1 there is shown an optical member 12, such as a mirror or prism, which may be part of an optical train. The optical member 12 is immersed at substantially neutral buoyancy in a transparent fluid enclosed in a walled chamber, part of the wall 14 appearing in the Figure. The center of gravity of the optical member 12 coincides with the center of buoyancy thereof and the density of the mirror 12 is substantially equal to the density of the fluid, i.e., the mass of the optical member is equal to the mass of liquid displaced. A stem portion 16 of wall 14 having a free terminal end extends from the wall 14 to form a support. A helical spring or coiled wire 18 has a first terminal end circumscribing the free terminal end of the stem portion 16 and is attached thereto by an adhesive 20 or by mechanical means such as crimping. The coiled spring may be conical or helical and it may be flat or round.

The second terminal end of the coil 18 is inserted within the tubular portion of a ferrule 22 and is attached to the inner surface of the tubular portion by an adhesive. The ferrule 22 is formed of a light material such as aluminum, magnesium, plastic etc. The part of the coil 18 between its engagement with the stem portion 16 and the ferrule 22 comprises a free portion 19 which in its assembled position extends through a central hole in the optical element 12. The ferrule 22 is rigidly attached to the optical element 12 by a suitable means, an adhesive, for example. The optical member 12 is thus restrained in movement relative to movements of the walled chamber only by the free portion 19 of the coil 18 and the damping action of the fluid.

The free portion 19 of the coil 18 is centered on the central plane of the optical element 12. It is also symmetrically arranged about the element's central axis. The element is therefore permitted a substantially pivotal motion about its geometric center, which, since the optical element is normally a symmetrical body, is also its center of gravity.

In the embodiment of FIG. 2, a bore 24 in the end of the stem 16 receives a shaft 30 which extends through a hole 32 in the ferrule 22, the hole 32 being of greater diameter than the shaft 30. It may be seen that if the optical element 12 is tilted more than a few degrees the edge of the hole 32 or the cemented portion of the coil 19 interferes with the movement of the shaft 30, stopping the element's tilt. It is particularly advantageous in certain hand held stabilized optical instruments to avoid wide swings of an optical element in a stabilizer cell. For example, in panning a telescope forces on an optical element might induce excessive tilt which the shaft 30 would limit. Without the shaft, a greater tilt might be induced by panning and upon completion of the panning motion the springlike action of the coil 18 would cause the returning mirror to overshoot its neutral position. Stopping the excessive tilt with the shaft enables the natural damping action of the viscous immersion fluid to stop the optical element's return action substantially in an aligned neutral position.

The impeding action of the shaft will also prevent excessive optical element movements from causing the free portion 19 of the coil 18 to exceed either its tensile or torsional yield point.

The shaft 30 extends axially from a circular cap 34 having a diameter greater than the central hole 32 of the ferrule 22 and of the hole in the optical element 12. The cap 34 serves as a stop to prevent the coil 18 from being pulled from its anchoring positions in the event of forces applied against the rear of the optical element 12 which would urge it toward the cap 34 stretching the coil 18 longitudinally.

FIG. 3 illustrates a variation of the invention wherein the ferrule 22a includes an extended tubular portion 42 terminating in an outwardly extending annular lip 44 defining a diameter slightly greater than the internal diameter of the hole in the optical element 12. The ferrule 22a is made of a deformable, resilient material in such a case, and it may be pushed through the hole in the mirror to snap into place for easy assembly.

In FIG. 4 a modified ferrule 22b is shown having a base portion 46 closing one open end of the tubular portion of the ferrule 22b. The ferrule 22b provides a cup wherein a measured amount of adhesive 20 is deposited to receive a terminal end of the coil 18. The coil 18 can be attached to the ferrule 22b in a simple manner at the depth necessary to establish the free portion 19 of the coil 18 and to assure that the free portion of the coil is properly centered at the center of gravity of the optical element. For ferrules having central openings such as are shown in the preceding figures, the method here described could still be used if a plug of suitable shape and which was impervious to the adhesive were inserted into the central opening to define a cavity to receive both the adhesive and the coil to the requisite depth.

When the instrument containing the stabilizing cell and its optical element is to be transported or subjected to violent shock or impact a cage mechanism can be used to hold the optical element in fixed relation to the chamber thereby reducing the possibility of damage either to the mount or the element.

In FIG. 5 a caging mechanism is shown which takes special advantage of the shaft and cap assembly appearing in FIG. 2 above. An optical element, such as a mirror 12b is shown immersed in a fluid which is contained in a chamber formed by the walls 14b. The mirror, as shown in the embodiment of FIG. 2 is mounted on a coiled wire 18b adhered to a stem 16b extending from the wall 14b and to a ferrule 22c which is attached to the optical element 12b in the same manner as disclosed for the embodiment of FIG. 2 and has a portion extending into an axial aperture of the mirror.

A circular cap 34b has a cylindrical shaft 30b extending therefrom whose free terminal end is attached to the stem portion 16b in the manner described for the embodiment disclosed in FIG. 2.

The wall 14b has a plurality of openings 52 formed therethrough which serve to relieve fluid pressures which may build up in the stabilizing chamber.

A spider 54 includes a series of outwardly extending legs 56 each of which is passed through and is axially movable in one of the openings 52. The legs 56 have free terminal ends which on movement of the spider 54 toward the optical element 12b will engage the back of the optical element 12b effectively immobilizing it. The spider may be activated by pressing against a button 58. Means may be provided for guiding the spider 54 to a predetermined position and for locking it and unlocking it in the engaged position. The locked position is chosen originally to establish the optical element 12b in optical alignment with other elements of an optical system of which the stabilizer cell is a part.

A modification of the coil is disclosed in FIG. 6 wherein the terminal ends of the coil 18c include tail portions 62 which comprise single straight strands of the wire making up the coil and which extend from the ends of the coil on a line which is co-axial with the coil. The stem portion 16c includes a bore which is slightly greater than the tail portion 62 within which the tail portion is engaged and adhered thereto by cement or other appropriate adhesive. The other tail portion 62 is engaged to a ferrule 22d which has an aperture formed in its cap portion 64. This tail portion 62 is adhered to the edges of the hole in the cap portion 64 by a gob of cement. The embodiment of the mount shown in FIG. 6 isolates the adhesive from the coils of the coiled wire 18 and thereby prevents interferences with the spring action when the adhesive gets into the coils.

I claim:
1. Apparatus disposed within a stabilizer cell having at least one wall, comprising:
   an optical element spaced from the wall of the cell;
   means extending from the wall of the cell for supporting said optical element;
   a spring for connecting said optical element to said support means and having a free portion between the connection of said optical element to said support means; and a shaft for limiting tilting movement of said optical element extending from said support means, and a portion of said shaft being circumscribed by said spring.

2. The invention of claim 1, including a ferrule for restraining movement of said optical element relative to the wall attached to said optical element and said spring.

3. The invention of claim 2, wherein said ferrule is provided with a hole, said shaft extending through the hole; and including a cap attached to said shaft for limiting movement of said optical element along said shaft.

4. The invention of claim 3, including means for immobilizing said optical element by locking said optical element against said cap.

5. Apparatus for stabilizing an optical element within a stabilizer cell having at least one wall, comprising:

an optical element disposed within the cell and spaced from the wall of the cell;

a fluid within the cell for damping motion of said optical element and buoyantly supporting said optical element;

support means extending only from the wall of the cell for supporting said optical element; and a spring yieldingly mounting said optical element on said support means for protecting said optical element from shock and said spring defining a free portion between first and second ends, the first end being connected to said support means and the second end being connected with said optical element.

6. The apparatus of claim 5, with said support means being a stem extending from the wall of the cell to a terminal end, and the first end of said spring being connected to the terminal end of said stem.

7. The apparatus of claim 6, with said optical element having a central hole positioned along a central axis, said spring extending through the central hole, the free portion of said spring being centered on and symmetrically arranged about the central axis of said optical element; and a ferrule being attached to the second end of said spring and at the central hole of said optical element.

* * * * *

UNITED STATES PATENT OFFICE
CERTIFICATE OF CORRECTION

Patent No. 3,824,000 Dated July 22, 1974

Inventor(s) Richard H. Burns

It is certified that error appears in the above-identified patent and that said Letters Patent are hereby corrected as shown below:

Col. 1, line 24, after "hand" insert --held--.

Signed and Sealed this twenty-seventh Day of April 1976

[SEAL]

Attest:

RUTH C. MASON
Attesting Officer

C. MARSHALL DANN
Commissioner of Patents and Trademarks